Patented Mar. 1, 1938

2,109,842

UNITED STATES PATENT OFFICE 2,109,842

WATER-OIL EMULSIONS AND PROCESS OF PRODUCING SAME

Benjamin R. Harris, Chicago, Ill.

No Drawing. Application February 27, 1930, Serial No. 431,964

16 Claims. (Cl. 167—91)

My invention relates in general to water-oil emulsions and process of producing the same.

In the art of making water in oil emulsions and oil in water emulsions, it is customary to bring the ingredients into intimate contact with each other by shaking, agitating, beating, homogenizing grinding, working in a colloid mill or using some other means for the purpose of subdividing the disperse phase in intimate contact with the continuous phase, and, generally speaking, in the presence of a suitable emulsifying agent.

Some of the better known emulsions of this kind are, for example, oleomargarine, which is essentially an emulsion of oils and fats and water with finely subdivided clotted casein as the emulsifying agent, vanishing cream, which is stearic acid emulsified with potassium or sodium soap in water; cold creams which essentially are emulsions of oleaginous materials with soap and water; certain types of furniture polishes, which likewise are emulsions of various kinds of oils, among them mineral oil and turpentine and water or aqueous liquid such as vinegar with a suitable emulsifying agent, bread doughs and cake batters, etc.

These and similar emulsions are generally made with vegetable, animal or mineral oils and fats, which are, for all practical purposes, immiscible with water and aqueous liquids.

The stabilities of these emulsions vary, but on aging, sooner or later, all of them reach a point where an appreciable separation of one or the other phase or both phases commences to become noticeable. The ease with which this deterioration sets in is dependent upon a number of factors—the relative proportion of emulsifying agent; character of the emulsifying agent; the thoroughness of initial emulsification; storage conditions, etc.

One of the principal objects of my invention is to stabilize emulsions of this general character.

I have found that emulsions of the general character described above as well as other emulsions comprising oleaginous and fatty materials and water or aqueous liquids may be appreciably improved by the introduction of a proportion of certain types of materials, which I designate as hydrophyllic lipins and which are described in greater detail hereinafter. In certain cases, if desired, the oleaginous substance may be entirely replaced by hydrophyllic lipins.

One of the principal differences between my hydrophyllic lipins and the oleaginous substances used heretofore in water and oil emulsions is that my substances have a more or less marked affinity for water and aqueous liquids, whereas the oleaginous substances used heretofore, such as corn oil, cotton seed oil, various marine oils, linseed oil, tung oil, oleo oil, beef stearine, turpentine, liquid paraffin, etc., are distinctly immiscible with water, are not readily wetted by water to any appreciable extent and do not show the affinity for water, which characterizes, in part, my hydrophyllic lipins.

Generally speaking, the hydrophyllic properties of my lipins manifest themselves by capacity, in varying degrees, to imbibe water, to be wetted by water and to foam or froth with water. It is common knowledge to those skilled in the art that the fats and oils used heretofore are, generally speaking, notably deficient in this capacity.

In general, my hydrophyllic lipins are characterized by the presence of a group of moderately high molecular weight, say, from about six carbons up, and of predominantly oleaginous or hydrocarbon characteristics, which imparts the strictly oleaginous character to a portion of the hydrophyllic lipin molecule and another group, or association of groups, of relatively smaller molecular weight with at least one unesterified hydroxyl group attached to carbon and with distinctly hydrophyllic characteristics; that is, a group which imparts to the molecule as a whole a certain degree of affinity for water and aqueous media not possessed by the oleaginous materials such as linseed oil, lard, petrolatum, soy bean oil, etc., heretofore used in oil and water emulsions.

Some of my hydrophyllic lipins which are of particular value are the following:

1,6-dilauryl diglycerol
Mono melissyl ester of diethylene glycol
Mono oleyl diglycerol
Mono-abietic acid ester of triglycerol
Mono stearyl glycerol
Mono cetyl ether of glycerol
Mono oleyl glycerol
Di ethylene glycol mono-stearate An example of the way in which my invention may be carried out in the manufacture of vanishing cream is as follows:

| | Grams |
|---|---|
| Rosewater | 1400 |
| Glycerine | 300 |
| Stearic acid | 120 |
| Potassium hydroxide | 12 |
| Monostearyl ester of diethylene glycol | 60 |

The ingredients, exclusive of the lipin, are warmed, (to saponify), and agitated together in the usual order and manner by means of a suitable stirring apparatus or a colloid mill. Finally, while still warm, this mixture is treated with the hydrophyllic lipin with stirring. A suitable amount of coloring and scent material may be added. Other ingredients may also be added such as zinc oxide or other medicaments may be incorporated. Starch may also be incorporated to give the product whitening qualities.

The mono stearyl diethylene glycol used in connection with the above product will give the finished product a good texture, greater resistance to syneresis and excellent spreading value on the skin.

Hydrophyllic lipins can also be used in the preparation of cold creams. Where lanolin is used, the lanolin may be entirely or partially substituted with hydrophyllic lipins. In formulae where beeswax is used, this product may also be substituted in part or in whole with lipin.

In cosmetic cold cream formulae, which contain a proportion of white vaseline or oils or fats, a part of the fatty ingredient may be substituted with the hydrophyllic lipin to give desirable results. Thus, for example, in the following formula:

| | |
|---|---|
| Stearic acid grams | 1000 |
| Lard do | 200 |
| Ammonia water (sp. g. 0.880) cubic centimeters | 100 |
| Distilled water do | 7700 |
| Scent | | the lard may be advantageously replaced by 200 grams of monostearyl diglycerol. When this change is made, the saponification of the stearic acid with the ammonia is preferably carried out first, after which the lipin is introduced; in other respects, the usual procedure for making a face cream of this type may be followed.

It will seem that one outstanding characteristic of the constitutional structure of my hydrophyllic lipins is that the fatty character of the otherwise oleaginous molecule is partly offset and attenuated by the presence of hydrophyllic hydroxyl groups attached to carbon. The extent of this effect, however, is not so great as to render the lipin freely miscible with certain aqueous media as is the case for example with the ordinary "sulphonated" oils of commerce.

I have found that the degree of the attenuation of the oleaginous characteristics is by no means the same in different hydrophyllic lipins, but that it varies, among other things, first: with the number and character of the hydroxyl groups present, and second: with the mass and character of the oleaginous group or groups. The illustrations given below will serve to make these two points clear:

Of the following three substances:

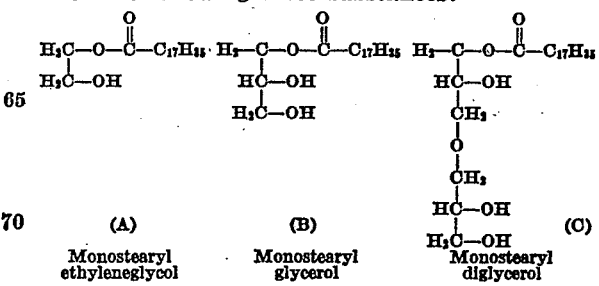

A is the least hydrophyllic and C the most pronouncedly hydrophyllic. It will be observed that while the fatty residue is constant throughout, the number of hydrophyllic groups increases going from A to C.

Secondly, in the following three hydrophyllic lipins:

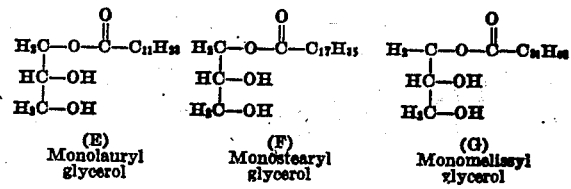

E is relatively more hydrophyllic than F and F in turn is more hydrophyllic than G: the hydrophyllic group is the same throughout but the oleaginous character is asserted least in E by the relatively small lauryl group.

It will thus be understood by those skilled in the art, that my invention embraces a broad class of materials of varying degrees of fatty and hydrophyllic characteristics. The particular purpose for which a hydrophyllic lipin is to be used will, in general, in a large measure, govern the decision as to which lipin should be employed.

It is by no means to be understood that my hydrophyllic lipins are limited to the particular substances specifically named in this specification by way of example. Many organic water soluble polyhydroxy substances such as glycerol, polyglycerols, glycols, polyglycols, such as diethyleneglycol, sugars, mannitol, sorbitol and other polyhydroxy alcohols and various other water soluble polyhydroxy substances may be used in which one or more than one hydroxyl is converted to an ether or ester group. These ether and ester groups are preferably high or moderately high molecular weight, say, from $C_6$ up.

In general, the hydrophyllic character of a given substance may be considerably increased by esterifying one or more of its hydroxyl groups with sulphuric acid. The product so produced may be used for the purposes of my invention and is contemplated thereby, particularly when it is produced in the form of a solid as described in my co-pending application.

Throughout this specification, I have used the prefix "poly" to denote more than one.

There are carboxylic esters with unesterified hydroxyl groups which however, are not sufficiently hydrophyllic to offer any marked advantages over the fats and oils used heretofore. Examples of such esters are distearyl glycerol, dipalmityl glycerol, monopalomityl-mono-stearyl glycerol. As shown above, monostearyl glycerol is much more hydrophyllic because it contains a larger hydrophile, namely two hydroxyl groups in place of one hydroxyl group, as in the case of distearyl glycerol.

I have disclosed the details of my invention in considerable detail so that those skilled in the art may be able to practice the same. I wish to point out, that in the use of the hydrophyllic lipins of the character set forth, with a given emulsion, a selection should be made in accordance with the emulsion product manufactured. The most pronouncedly hydrophyllic lipin is not necessarily always of most value.

The chemical substances which I employ in accordance with my invention may be represented by the general formula

wherein "O" and "H" are oxygen and hydrogen respectively, "v", "w" and "z" are relatively small whole numbers, "X" represents the carbon skeleton of a polyhydroxy substance with groups (OH) and (RO), wherein "R" is an acyl, alkyl or some other substantially lipophillic group, and wherein the ratio of "$w$" to "$v$" is at least one.

It is obvious for the reasons stated, that the invention is not limited in any respects, except within the scope of the appended claims.

What I claim is new and desire to protect by Letters Patent of the United States is:

1. A process for the production of emulsions, in which polyhydric alcohols partially esterified with fatty acids of high molecular weight are emulsified with water or aqueous solutions of suitable substances in the presence of substances having an alkaline reaction.

2. As a new composition of matter, an emulsion comprising water, polyhydric alcohols partially esterified with fatty acids of high molecular weight, and also containing substances of alkaline reaction; the external phase of the said emulsion comprising water.

3. As a new composition of matter, an emulsion comprising water, polyhydric alcohols partially esterified with fatty acids of high molecular weight, oleaginous matter selected from a class consisting of fatty acids, waxes, natural fats and oils, and also containing substances of alkaline reaction; the external phase of the said emulsion comprising water.

4. In the production of emulsions, the process which comprises emulsifying polyhydric alcohols, partially esterified with fatty acids of high molecular weight, with water or with aqueous solutions of suitable substances, in the presence of small amounts of substances having an alkaline reaction.

5. An emulsion comprising water, at least one polyhydric alcohol partially esterified with fatty acids of high molecular weight and also containing a small amount of substances of alkaline reaction; the continuous phase of the said emulsion being aqueous.

6. An emulsion comprising water, polyhydric alcohols partially esterified with fatty acids of high molecular weight, oleaginous matter selected from a class consisting of fatty acids, waxes, natural fats and oils, and also containing a small amount of a substance of alkaline reaction; the continuous phase of the said emulsion being aqueous.

7. An emulsion comprising water, glycerol partially esterified with fatty acids of high molecular weight, and also containing substances of alkaline reaction; the external phase of the said emulsion comprising water.

8. A cosmetic emulsion comprising water, glycerol partially esterified with fatty acids of high molecular weight, additional oleaginous matter selected from a class consisting of fatty acids, waxes, natural fats and oils; and also containing substances of alkaline reaction; the external phase of the said emulsion comprising water.

9. In the production of cosmetic emulsions, the process which comprises emulsifying polyhydric alcohols, partially esterified with fatty acids of high molecular weight, with water or with aqueous solutions of suitable substances, in the presence of small amounts of substances having an alkaline reaction.

10. A cosmetic emulsion comprising water, at least one polyhydric alcohol partially esterified with fatty acids of high molecular weight and also containing a small amount of substances of alkaline reaction.

11. A vanishing cream comprising an emulsion containing water, a normally solid higher fatty acid, an alkaline material, and a small proportion of a polyhydric alcohol partially esterified with fatty acids of high molecular weight.

12. A cosmetic emulsion comprising water, oleaginous matter selected from a class consisting of fatty acids, waxes, natural fats and oils, a small amount of a substance of alkaline reaction, and a minor proportion of a higher fatty acid monoglyceride.

13. An emulsion comprising water, oleaginous matter selected from a class consisting of fatty acids, waxes, natural fats and oils, a small amount of a substance of alkaline reaction, and a minor proportion of monostearin.

14. A vanishing cream comprising an emulsion of water, stearic acid, a small amount of soap, and a minor proportion of a polyhydric alcohol partially esterified with a fatty acid of high molecular weight.

15. A cosmetic emulsion comprising water, oleaginous material selected from a class consisting of fatty acids, waxes, natural fats and oils, a small amount of soap, and a minor proportion of a higher fatty acid monoglyceride.

16. A cosmetic emulsion comprising water, oleaginous material selected from a class consisting of fatty acids, waxes, natural fats and oils, a small amount of soap, and a minor proportion of monostearin.

BENJAMIN R. HARRIS.